United States Patent
Kindersley et al.

(10) Patent No.: US 10,400,900 B2
(45) Date of Patent: Sep. 3, 2019

(54) MULTI-PORT BALL VALVE WITH INDUCED FLOW IN BALL-BODY CAVITY

(71) Applicant: Velan Inc., Montreal, Quebec (CA)

(72) Inventors: Peter Geoffrey Kindersley, Queensbury, NY (US); Kyle Phillip Zedick, Northfield, VT (US)

(73) Assignee: VELAN INC., Montreal, Quebec (CA)

( * ) Notice: Subject to any disclaimer, the term of this patent is extended or adjusted under 35 U.S.C. 154(b) by 152 days.

(21) Appl. No.: 15/542,862

(22) PCT Filed: Feb. 10, 2016

(86) PCT No.: PCT/IB2016/000113
§ 371 (c)(1),
(2) Date: Jul. 11, 2017

(87) PCT Pub. No.: WO2016/132198
PCT Pub. Date: Aug. 25, 2016

(65) Prior Publication Data
US 2018/0003304 A1    Jan. 4, 2018

Related U.S. Application Data

(60) Provisional application No. 62/117,508, filed on Feb. 18, 2015.

(51) Int. Cl.
*F16K 5/06* (2006.01)
*F16K 5/20* (2006.01)
*F16K 11/087* (2006.01)

(52) U.S. Cl.
CPC .......... *F16K 5/0605* (2013.01); *F16K 5/0689* (2013.01); *F16K 5/207* (2013.01); *F16K 11/0876* (2013.01)

(58) Field of Classification Search
CPC .... F16K 5/0605; F16K 5/0689; F16K 11/087; F16K 11/0876; F16K 5/207; Y10T 137/86871; Y10T 137/8782
(Continued)

(56) References Cited

U.S. PATENT DOCUMENTS

| | | | |
|---|---|---|---|
| 1,177,968 | A | 4/1916 | Smith |
| 3,036,600 | A | 5/1962 | Vickery |

(Continued)

FOREIGN PATENT DOCUMENTS

| | | |
|---|---|---|
| CN | 201363458 | 12/2009 |
| JP | S54 182950 | 12/1979 |

(Continued)

OTHER PUBLICATIONS

Machine Translation of JP2004124982, published 2004, retrieved Feb. 14, 2019 (Year: 2004).*

(Continued)

*Primary Examiner* — Michael R Reid
(74) *Attorney, Agent, or Firm* — Nixon & Vanderhye P.C.

(57) ABSTRACT

A multiport ball valve body has one entry port and at least two exit ports disposed transversely to the ball valve body entry port. A ball disposed in the body has one entry port and one exit port that is disposed transversely to the ball entry port. The ball can be rotated to selectively align the ball exit port with one of the at least two body exit ports. Holes through the ball admit part of the fluid flow into the cavity between the ball and the body, and internal parts are exposed, such that the cavity and the internal parts are kept flushed.

19 Claims, 6 Drawing Sheets

(58) Field of Classification Search
USPC .......... 251/315.01, 315.16; 137/625.47, 876
See application file for complete search history.

(56) References Cited

U.S. PATENT DOCUMENTS

| | | | |
|---|---|---|---|
| 3,270,772 A | 9/1966 | Rakus | |
| 3,333,813 A | 8/1967 | Rabe | |
| 3,464,449 A | 9/1969 | Morton | |
| 3,985,150 A | 10/1976 | Kindersley | |
| 4,099,543 A | 7/1978 | Mong et al. | |
| 5,181,539 A | 1/1993 | Yokoyama | |
| 5,287,889 A | 2/1994 | Leinen | |
| 5,593,135 A | 1/1997 | Lester et al. | |
| 6,974,116 B1 * | 12/2005 | Christenson | F16K 5/0605 137/625.32 |
| 2007/0261745 A1 | 11/2007 | Hollis | |
| 2008/0105845 A1 | 5/2008 | Yeary | |
| 2012/0012770 A1 | 1/2012 | Bugatti | |
| 2015/0285143 A1 * | 10/2015 | Pollock | F02C 9/18 251/315.01 |

FOREIGN PATENT DOCUMENTS

| | | |
|---|---|---|
| JP | H-11304016 | 11/1999 |
| JP | 2004-124982 | 4/2004 |
| WO | 2015/157011 | 10/2015 |
| WO | WO 2016/132198 | 8/2016 |

OTHER PUBLICATIONS

International Preliminary Report on Patentability with transmittal, in Application No. No. PCT/IB2016/000113 dated Aug. 22, 2017, dated Aug. 31, 2017, 8 pages.

International Search Report in International Application No. PCT/IB2016/000113 dated May 30, 2016.

Written Opinion of the International Searching Authority in International Application No. PCT/IB2016/000113 dated May 30, 2016.

Extended European Search Report in EP Application No. 16751976.8 dated Sep. 13, 2018 (8 pages).

English Translation in Office Action in JP Patent Application No. 2017-544650 dated Sep. 5, 2018 (18 pages).

* cited by examiner

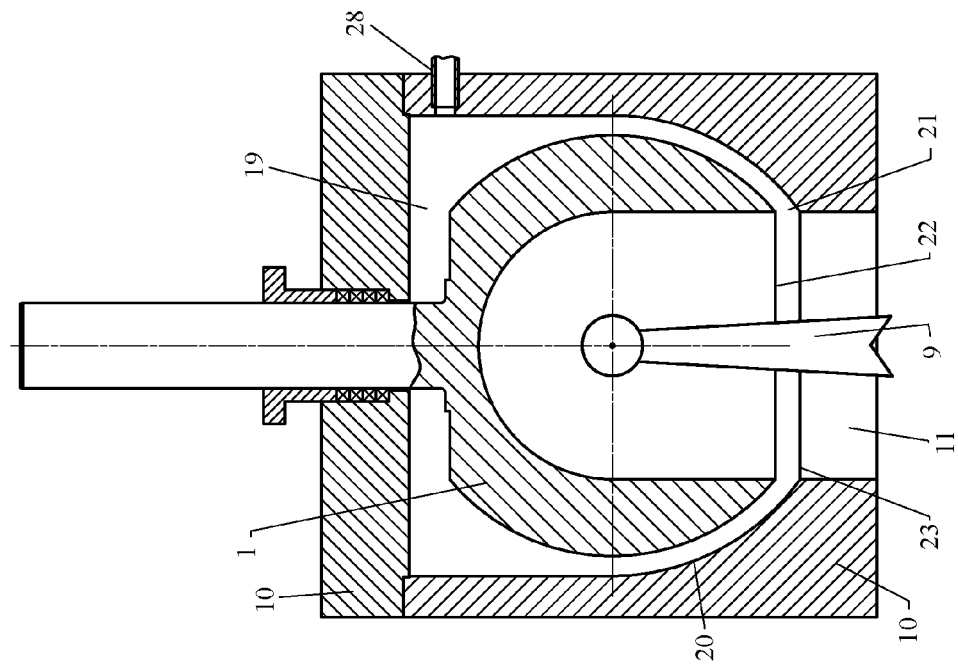
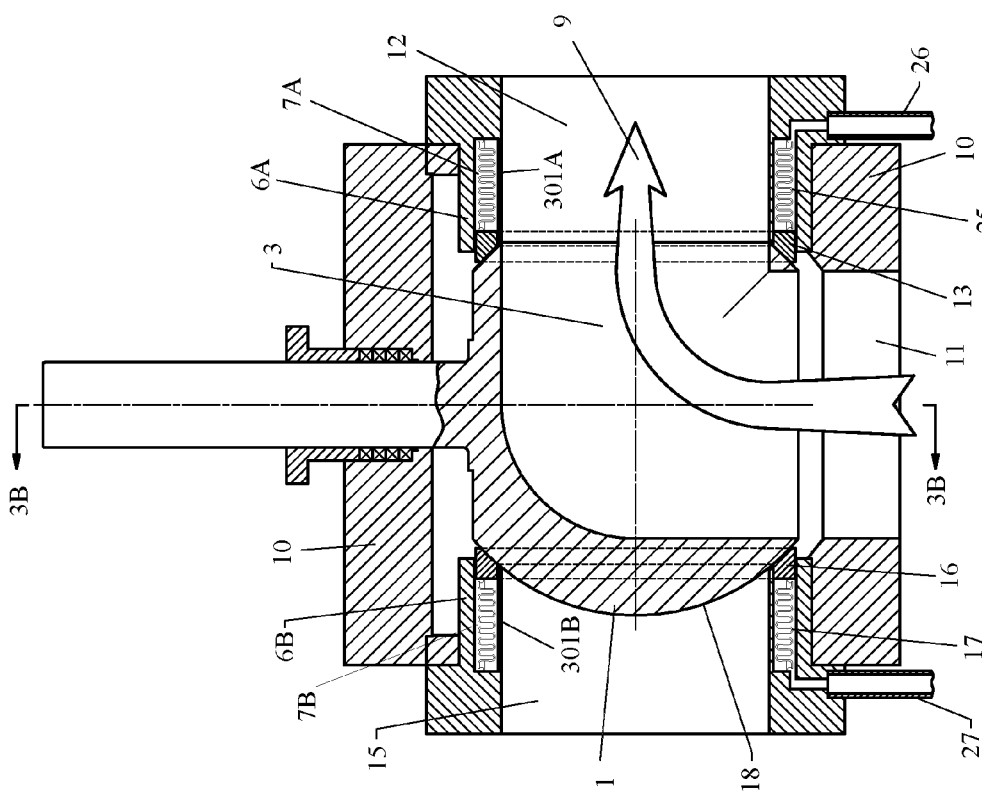
FIGURE 3A
(PRIOR ART)
FIGURE 3B
(PRIOR ART)

MULTI-PORT BALL VALVE WITH INDUCED FLOW IN BALL-BODY CAVITY

CROSS-REFERENCE TO RELATED APPLICATION

This application is the U.S. national phase of International Application No. PCT/IB2016/000113 filed Feb. 10, 2016 which designated the U.S. and claims priority benefit of U.S. provisional application 62/117,508 filed in the U.S. Patent and Trademark Office on Feb. 18, 2015. The entire contents of these applications are hereby incorporated herein by reference.

BACKGROUND

In the field of refining petroleum crude oil, a process unit called the Delayed Coker increases the yield of gasoline and other high grade products by reprocessing heavy bottom oil from one of the other process units called the Fractionator, adding value of tens of thousands of dollars per day. In the Delayed Coker process unit, the heavy oil is first passed through heaters, then passed through a special multi-port metal-seated ball-type diverter valve, called the "switch valve", which is one application for this invention.

The switch valve diverts the flow of heated heavy oil into two large drums, or into a third drum bypass connection. The heated oil remains as liquid only for a period of time after being heated, called the "dwell" time, typically ½ to 2 hours after being heated, following which it solidifies into what is called "petroleum coke", which is a hard form of mostly carbon. That solidification takes place in the two drums, from which the coke is removed with special equipment.

It is important that the heated oil reaches the drums before the dwell time has elapsed, so that solidification takes place there, not in the heaters, or piping, or in the switch valve. This property of heavy oil, namely conversion to solid state, presents problems in design of the switch valve, since the valve design must provide for no stagnant areas, or slow-flowing areas where heavy oil could remain longer than the dwell time. Otherwise, stagnant or near-stagnant heavy oil will convert to solid coke in such areas, and make the valve difficult or impossible to operate, or cause it to leak. Such problems can necessitate a costly shutdown of the process unit, to clean out the valve.

Some improvements of the ball valve have been attempted to resolve this problem, such as described in U.S. Pat. No. 5,181,539, which discloses having many notches that allow flow through the ball/body cavity. The one hole provided is required to be small in diameter and placed at the bottom of the drive socket. The '539 patent also requires a taper through the ball in order to induce a pressure difference that would cause flow through the ball/body cavity.

An attempt disclosed in U.S. Patent App. Pub. No. 2012/0012770 describes having small drill holes through the ball surface of a straight through valve to place the main passage in fluid communication with the plug seat in the valve body.

Similarly, U.S. Pat. No. 1,177,968 describes adding a small hole through one cheek of the ball of a straight through valve in order to drain the contents of the flow path through the ball when the valve is closed.

U.S. Pat. No. 3,036,600 adds a number of small holes near the upstream end of the ball's through passage in order to admit a small amount of fluid at the start of the ball rotation.

U.S. Pat. No. 3,270,772 includes a number of small holes in the ball valve for adding a lubricant through the outer surface of the ball into a separate chamber in the ball, not into the waterway.

U.S. Pat. No. 3,333,813 discloses a straight through ball valve with small vent holes in the ball between the waterway and the valve body to vent the ball/body cavity.

Additionally, U.S. Pat. No. 3,464,449 discloses a ball with a hole from one part of the ball's exterior surface to another part of the ball's exterior surface, and the hole does not communicate with the ball's waterway.

Furthermore, U.S. Pat. No. 5,287,889 discloses a throttling valve, not an on/off or switch valve, with a number of small holes that provide a varying number of alternative flow passages as the ball is rotated, and discharges the fluid into the outlet passage but does not cause fluid recirculation.

Other approaches to such problems have been described in U.S. Pat. Nos. 3,985,150 and 4,099,543 and in published U.S. patent application 2008/0105845.

While there have been other ball valves that added holes through balls, such as improvement attempts described above, the added holes of the example embodiments herein differ because the presently improved ball has a different shape, e.g., with a 90 degree through passage, instead of a straight through passage, therefore requiring holes in positions and shapes that have not heretofore been contemplated or described. For example, some embodiments described below use tapered (e.g., conical) flow passages through the ball into and/or from the ball-cavity space. Example embodiments generally perforate the ball so as to better use direct momentum of the main fluid flow to push fluid from the main fluid flow path into the ball/body cavity (e.g., so as to provide a relatively large volume flow that is redirected from the main fluid flow into the ball/body cavity).

Accordingly, further improvements are sought to decrease stagnation of oil around the ball and body cavity of the switch valve, and increase fluidity in the switch valve.

BRIEF SUMMARY

The principal areas at risk for stagnation of oil in the switch valve are (a) in the cavity between the outside diameter of the ball and the inside diameter of the body, known as the "ball/body cavity", and (b) in cavities between the outside diameter (OD) of the metal bellows-type back-of-seat seals and the tubes in which they reside, known as the "bellows OD area".

Historically, steam purging has been used in these potentially stagnant areas in the switch valve, to assure exchange of the oil there. The effectiveness of this steam purge depends on the volume of steam used. Unfortunately, process-wise, it is undesirable to add the required amount of steam because it has an unwanted cooling effect, and it must later be disposed of as foul water. However it has been necessary to add steam, since that is the only way, until at least some embodiments of this invention, to assure valve operability. The steam supply can have problems of its own. The steam may not always be available in the quantity and pressure needed due to unanticipated large demand elsewhere, supply system equipment failure, operator errors, or other problems.

For such reasons, it is highly desirable to develop a switch valve design that does not require steam purging of the ball/body cavity and the bellows OD areas to prevent oil stagnation. It is one objective of example embodiments of this invention to provide an improved valve through inclusion of a novel ball and a bellows containment area, and to reform two areas of the valve body. It is a further objective that the ball and internal parts modifications be both simple and economical to manufacture. It is also an objective to provide a modification that can be retrofitted to hundreds of existing valves that are currently in service.

It is the purpose of example embodiments of this invention to improve reliability of the switch valve by removing substantially all potentially stagnant areas and slow-flowing areas in cavities of the valve body. This is accomplished in an example embodiment by providing one or more of: an improved ball, improved support tubes for the bellows-type seat seals, a reshaped top cover internal surface, and an added Venturi-type conical shape to the inlet passage of the valve body.

The new ball provides a simple, reliable way to force a substantial portion of fluid flowing through the ball valve to go into the ball/body cavity, where it circulates around the ball and around the OD of the bellows, to create a complete re-circulated oil flow inside the valve ball/body cavity. This is accomplished in example embodiments by the addition of scientifically shaped and strategically placed holes through the ball, a specially shaped underside of the valve's top cover, large strategically placed cutouts in the tubes that surround the bellows, and a Venturi entrance to the valve body. By adding these features, potentially stagnant areas in the ball/body cavity and bellows OD areas, and the undesirable steam purging of these areas, can be substantially or totally eliminated, thus meeting desired objectives.

One objective of the invention is to cause exchange and flushing of the fluid in the ball/body cavity and around the outside diameter (OD) of the bellows.

One example embodiment of a multi-port ball valve includes a ninety degree flow passage through the ball therein, with one body inlet and two or three body outlets, including strategically placed conical holes in the ball, from the ball interior up through the top surface of the ball. Bellows-type seat seals and seat seal support tubes with large cutouts are used and a curved body interior surface directs flow inside the valve body. A tapered valve body inlet assists part of the fluid that is flowing through the ball to flow through conical holes in the ball and into the ball/body cavity of the valve, thence outwards, downwards and around the ball outside diameter (OD) and around the OD of the bellows-type seat seals, to rejoin the main fluid flow passing through the ball at the inlet of the ball.

In this embodiment, a rapid exchange of fluid in the cavities of the body and around the metal bellows-type seat seals prevents stagnation of the fluid.

A first method provides holes in the top of the ball, leaving a gap between the bottom of the ball and the body, and making a tapered body bore reduction to create a Venturi suction effect at the annular space between the ball and the body close to the ball and body inlets. Using this method, a part of the stream will be deflected up to flow through holes in the top of the ball and into the ball/body cavity, flow downwards around the ball in the cavity, and flow out of that cavity at the bottom of the ball. The switch valve body inlet may include a tapered body bore towards the ball inlet. In this method, the flow through the ball/body cavity would be in the reverse direction to the main stream that flows through the ball bore to achieve a body cavity flush.

BRIEF DESCRIPTION OF THE DRAWINGS

FIGS. 1A, 1B, 2, 3A and 3B depict prior art ball and bellows chambers of the multi-port metal-seated ball-type valve that are typically used.

DETAILED DESCRIPTION OF EXAMPLE EMBODIMENTS

FIGS. 1A, 1B, 2, 3A and 3B illustrate a typical type of switch valve that is improved upon by the example embodiments described herein.

Figure 1A:
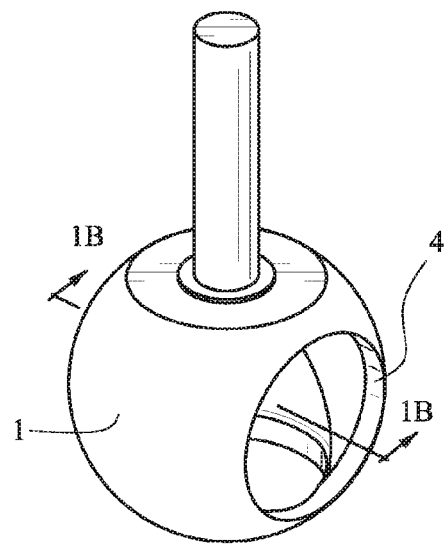
Figure 1B:
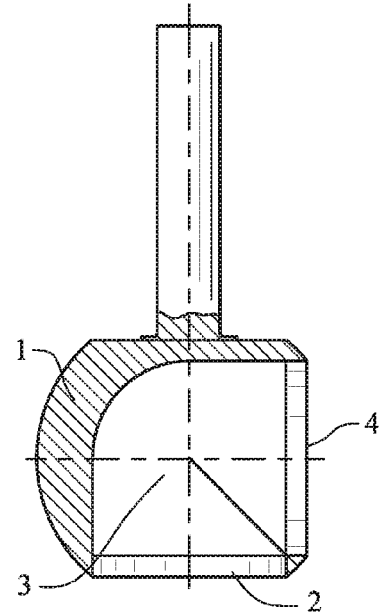

FIGS. 1A and 1B depict an unimproved ball that has been, and remains, in constant use in switch valves of oil refineries around the world, dating from the 1970's. FIG. 1A is a perspective view and the sectional view in FIG. 1B along cross-sectional line 1B-1B shows that the ball (1) has an inlet port (2), a 90-degree turn flow passage (3) through it, and an exit port (4). Heavy oil enters the ball (1) at the inlet port (2), and the oil is diverted 90 degrees by the turn in the flow passage (3) in the ball (1), then exits through the exit port (4).

Figure 2:
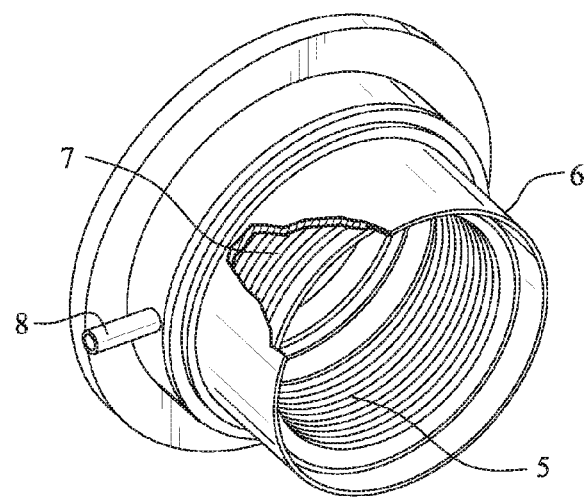

FIG. 2 depicts a metal bellows (5) that serves as a back-of-seat seal, also known as a bellows-type seat seal, residing in a flanged tubular member (6) that supports the metal bellows (5) and the seat (not shown in this figure). The unimproved flanged tubular support (6) has been cut away to show the outside diameter (OD) of the bellows for the purpose of showing the "bellows OD area" (7), which is a dead-end tubular space between the OD of the bellows (5) and the inside diameter (ID) of the tubular support (6). At the bellows OD area (7), oil would be stagnant if the bellows OD area (7) were not purged with steam through a purge connecting pipe (8) that feeds into the bellows OD area (7).

FIG. 3A shows the unimproved ball (1) installed in the switch valve body (10). The heavy oil enters the valve at the valve inlet port (also known as "entry port") (11) in the valve body (10), and is diverted by the 90-degree turn flow passage (3) of the ball (1), then exits a first valve discharge port (12), as shown by the flow arrow (9). At the first valve discharge port (12), there is an annular leak-tight metal seat (13) in contact with the ball (1). The annular leak-tight metal seat is also in contact with a bellows-type seat seal (25)

which is in compression. A second valve discharge port (15) is disposed 180 degrees around the valve body (10) from the first valve discharge port (12), with a second annular leak-tight metal seat (16) and bellows-type seat seal (17) at that position. The second valve discharge port (15) is blocked in the ball position depicted in FIG. 3A by a part of the spherical outer surface (18) of the ball (1). The bellows-type back-of-seat seals (25, 17) reside in support tubes (6A, 6B), creating bellows OD areas (7A, 7B). It is important to note that these bellows OD areas are dead-end cavities, but for the steam purge connections (26, 27). The prior art valve of FIG. 3A also includes tubular liners (301A, 301B) to permit steam purges of the bellows' ID surfaces.

As long as the ball is in the position shown in FIGS. 3A and 3B, oil continues to flow in at the valve inlet port (11) and out at the first valve discharge port (12). When it is desired to divert the oil out of the second valve discharge port (15), the ball (1) can be turned 180 degrees to divert the oil out of the second valve discharge port (15). The first discharge port (12) would then be blocked by the ball's spherical surface (18) after the ball (1) is turned. Approximately every 12 to 18 hours, the ball can be rotated 180 degrees to selectively divert oil out of either the first or the second valve discharge ports (12, 15), as the process requires.

FIG. 3B is a cross-sectional view along line 3B-3B of shown in FIG. 3A. FIG. 3B is included to show in detail the ball/body cavity (19). It is important to note that the ball/body cavity (19) is between the ball (1) and the inside surface (20) of the body (10), and that the ball/body cavity (19) is a dead-end cavity. It is in fluid communication with oil flowing through the valve, connected by the annular space (21) between the bottom portion of the ball (22) and an inlet portion the body (23) at the inlet port (11). The ball/body cavity (19) can be filled with oil that enters through the annular space (21). After the oil enters the ball/body cavity (19), oil would be non-flowing because the ball/body cavity (19) is a dead-end chamber. It is the ball/body cavity (19) and the two bellows OD areas (7A, 7B) that have been required, up until now, to be heavily purged with steam using the steam purge connections (26, 27, 28) to provide movement to non-flowing oil in those areas so that the non-flowing oil would not convert to hard coke. Since the volume of these cavities is significant, an undesirably large flow of purge steam is required to keep trapped oil interchanged and flushed out through the annular space (21).

Note that the switch valve can alternatively have three outlet ports, instead of the two illustrated in FIGS. 3A and 3B, if the ports are arranged at 120 degree intervals around the body from each other instead of 180 degrees. In that case, each outlet port would have a metal seat, a metal bellows-type seat seal in compression, and a tubular support identical to those shown in FIG. 3A. To divert oil, the ball would be rotated 120 degrees instead of 180 degrees to align with one of the three equally-spaced outlet ports.

FIGS. 4A, 4B, 5, 6A and 6B illustrate a first example embodiment of an improved ball, an improved underside of the body top cover, an improved tubular support for the bellows, and a new Venturi entry port in the body.

The improvement to the ball includes additions of new holes through the ball, which can be different in number and shape, and can be different in the precise locations of the new holes. A preferred conical shape is described in detail herein, but the conical shape is not the only shape that provides the ball improvement. The preferred number of holes can be two or three holes, and the preferred size is described. The underside of the top cover is curved to reduce turbulence and create smooth flow in that area. The tubular supports for the bellows have new cutouts in strategic positions to allow oil circulation all the way to the rear end of the bellows OD areas. The valve inlet port has a new Venturi taper added to the previous cylindrical inlet port. These features are shown in the figures, and described in further detail in the following paragraphs.

Figures 4A, 4B:
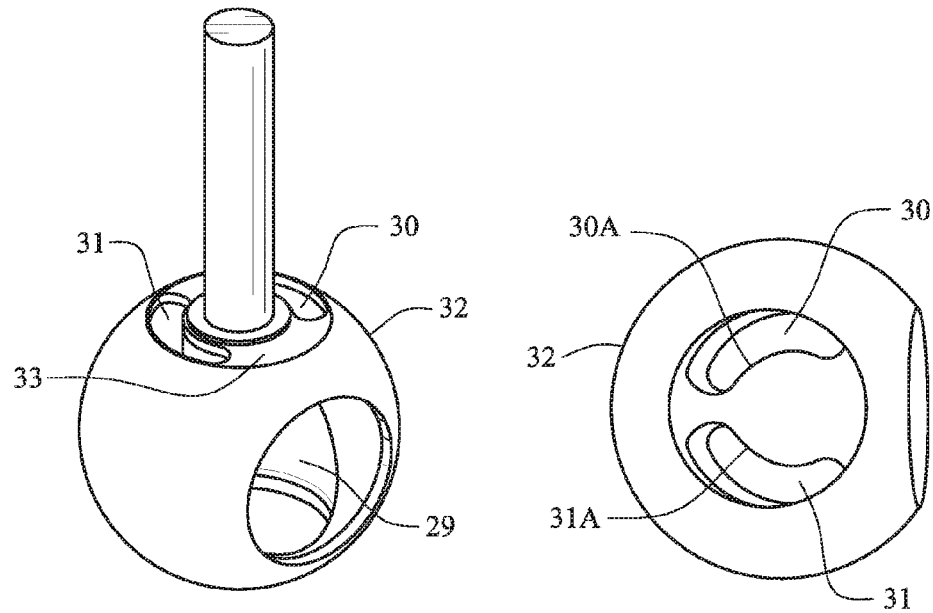
FIG. 4A is an isometric view of a first example embodiment of a novel and improved ball for a switch valve.
FIG. 4B is a bottom view of the improved ball shown in FIG. 4A, looking through the entry port of the improved ball towards the conical holes.

FIGS. 4A and 4B show the two new tapered (e.g., conical) holes (30, 31) that are added to the previous design of the ball (1) shown in FIGS. 1A to 3B, resulting in the improved ball (32) of FIGS. 4A and 4B. FIGS. 4A and 4B show the improved ball (32) from a perspective "top" view and from the "bottom" (entry port), respectively. The two new conical holes (30, 31) are arranged in a circular pattern and straddle the centerline of the flow passage (29). The conical holes (30, 31) have curved cross sectional areas, and extend from the 90-degree flow passage (29) towards and out through an upper truncated surface (33) of the ball (32).

Lower openings (30A, 31A) of the conical holes (30, 31) are openings that are provided on the inside surface of the ball (32), along the 90-degree flow passage (29). The combined area of the lower openings (30A, 31A) in the flow passage (29) is approximately between ½ to ¾ of the area of the flow passage (29), and the angles of the conical holes (30A, 31A) relative to the axis of the main incoming flow passage (29) may be approximately between 5 degrees to 30 degrees. The lower openings (30A, 31A) thus capture a substantial part of fluid flowing through the ball (32) and direct it towards the truncated top surface (33) of the ball. The cross-section of the conical holes (30, 31) may be arcuate in shape as depicted in the drawings.

Figure 5:
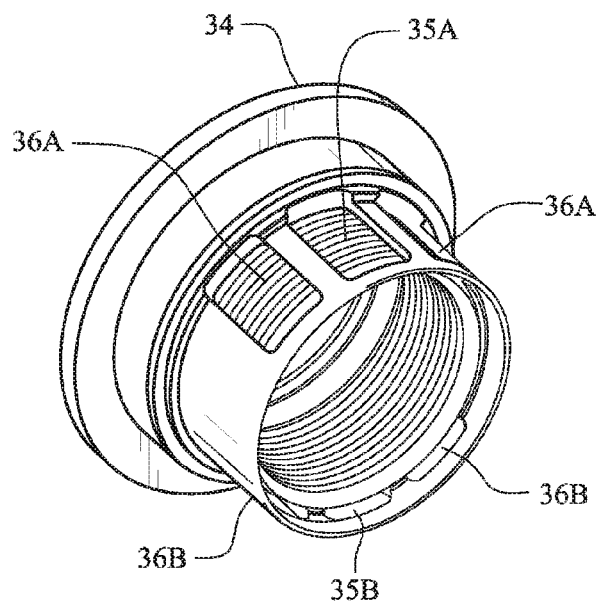
FIG. 5 is a perspective view of a metal bellows with an improved flanged tubular support having cutouts that are added to the flanged tubular support and seat supports of FIG. 2.

FIG. 5 illustrates an improvement to the flanged tubular supports (6A, 6B) shown in FIG. 3A. Each tubular support (34) in FIG. 5 includes new added cutouts or apertures. The new cutouts include: a top cutout (35A) located at the top portion of the tubular support (34), a bottom cutout (35B) located at the bottom portion of the tubular support (34), two top peripheral cutouts (36A) located on either side of the top cutout (35A), and two bottom peripheral cutouts (36B) located on either side of the bottom cutout (35B). In the configuration shown in FIG. 5, there are six cutouts in total on the tubular support (34). Alternatively, there may be other numbers of cutouts, e.g., possibly only four cutouts in total on the tubular support, including two cutouts on the top portion of the tubular support, and only two cutouts on the bottom portion of the tubular support.

By means of the new cutouts, oil moving downwards through the ball/body cavity (19) would enter the upper cutouts (35A, 36A), and flow downwards and around the bellows OD area, then exit out of lower cutouts (35B, 36B). The effect of the cutouts is to expose the bellows OD's to the ball/body cavity in order to assure that oil in the bellows OD areas is exchanged. The total area of the cutouts (35A, 36A, 35B, 36B) is preferably maximized to maximize the flow of oil around the bellows OD area, and may be approximately between 70% to 90% of the upper and lower surface areas of the tubular support (34).

Figure 6A:
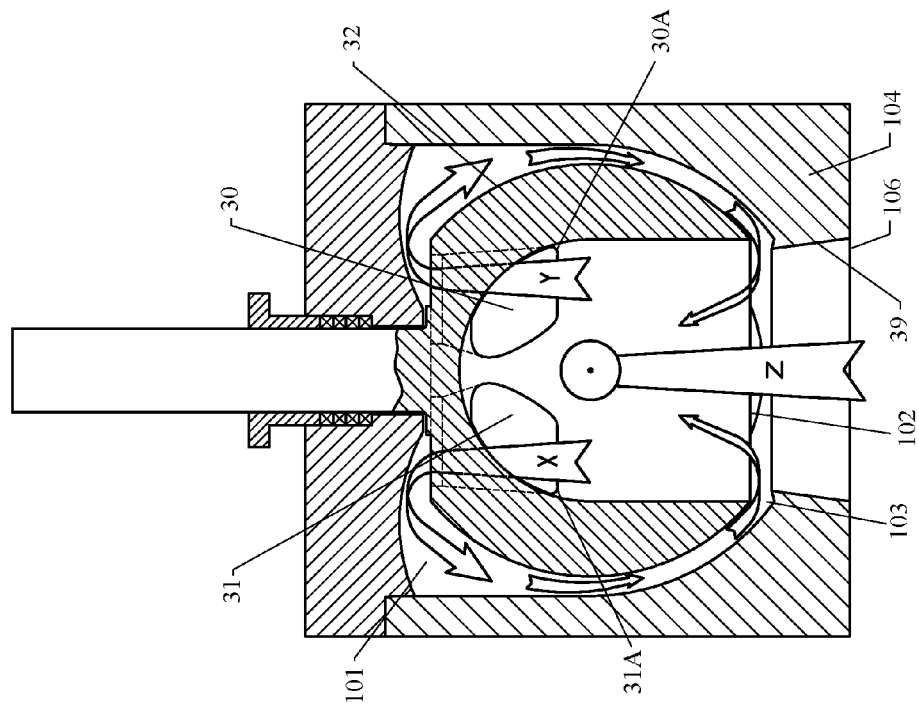
FIG. 6A is a cross-sectional view of an improved switch valve having the first embodiment improved ball, the improved tubular support, and improvements to the internal shapes of the valve body, including flow arrows illustrating the newly created flow circulations in the switch valve around the ball and around the bellows outside diameters.
Figure 6B:
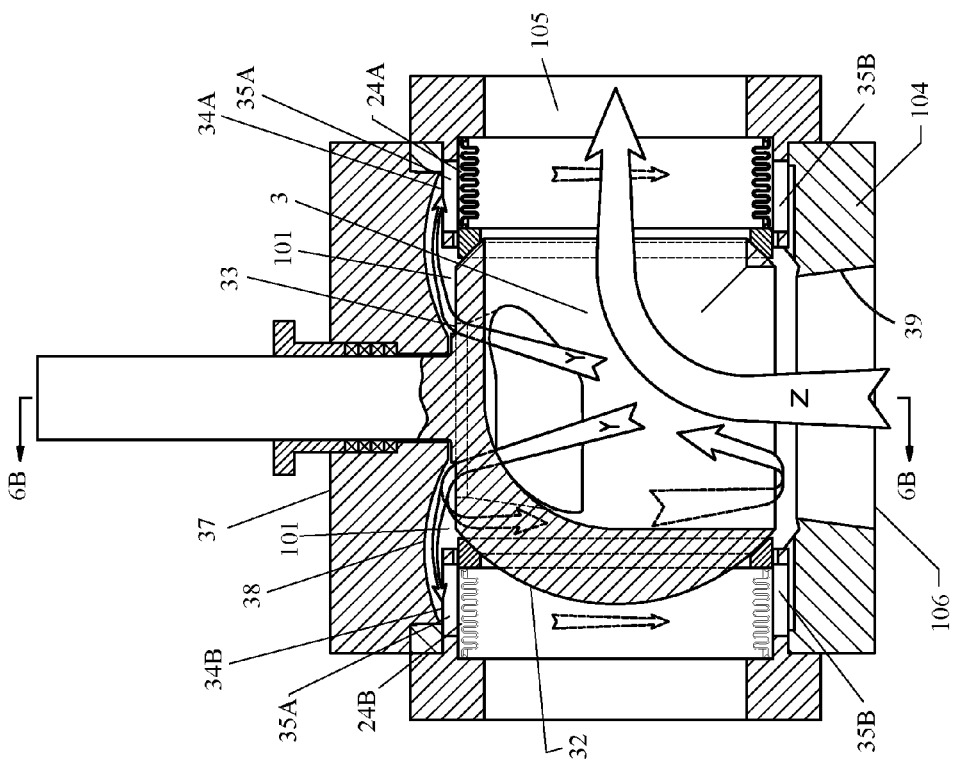
FIG. 6B is a cross-sectional view of the improved switch valve shown in FIG. 6A in the direction depicted by line 6B-6B.

FIGS. 6A and 6B show further details of an improved ball (32), an improved underside (38) of the top cover (37) of the valve body (104), and improved tubular supports (34A, 34B) installed in the valve body (104), with an improved tapered entry port (39) of the valve body (104). The tapered entry port (39) constricts flow from the body entry port (106) before it enters ball entry port (102). However the lower openings (30A, 31A) of the conical holes (30, 31) face the oncoming main flow Z of oil, so that they capture a portion of the oil main flow Z as shown by the flow arrows X and Y, and direct flow X and flow Y through the new conical holes (30, 31), through the upper truncated surface (33) of the ball (32), and into the ball/body cavity (101).

The improved underside (38) is a curved underside of the top cover (37) of the valve body (104) that is adjacent to the truncated top surface (33) of the ball (32). The curved underside (38) is concave with respect to the top of the valve body, and it is donut shaped when viewed in a plane parallel to the top truncated surface of the ball. The curved underside preferably has an inside diameter that coincides with the inside edge of the conical holes in the ball, and has an outside diameter extending toward the maximum length of the metal bellows. The curved underside may have a radius of between ⅓ to ⅔ the diameter of the valve body entry port.

The flow of oil X and Y are generated because the main flow Z of oil has momentum in a straight line as the main flow Z enters the body entry port (106) and ball entry port (102) and reaches the 90-degree turn in the ball (32), such that while a portion of the main flow Z is forced to turn 90 degrees in the ball (32) and flow out the exit port (105), a substantial portion of the main flow Z is diverted through the conical holes (30, 31) and into the ball/body cavity (101). The underside (38) of the top cover (37) is shaped with a new curved shape to reduce turbulence in the cavity over the truncated top of the ball (32), to create a smooth flow pattern (a) directing the flow of oil ultimately downwards around the ball (32), and (b) directed the flows X and Y into the bellows OD areas (24A, 24B).

An example of how oil can flow around the ball is shown by flow arrows X and Y. Flows X and Y are directed up through conical holes (30, 31), turned by the curved underside of the body top (38) down around the ball (32) by way of the ball/body cavity (101) and sideways by way of the curved underside (38) towards the tubular bellows supports (34A, 34B), continuing to flow down into the bellows OD areas (24A, 24B) by way of the new cutouts (35A, 36A) shown in FIG. 5, down and around the bellows OD's, through the new lower cutouts (35B, 36B), and through annular space (103) at the bottom of the ball (32) to rejoin the main flow Z of oil that is passing through the ball (32). It will also be noted in FIG. 6A that in this example embodiment, the tubular liners along the bellows' ID have been eliminated.

In addition to the force of momentum that causes a portion of the flow of oil up through the new holes (30, 31), thence down and around the ball (32) and the bellows (24A, 24B), there is an aspiration sub-pressure effect caused by oil flowing past the annular space (103) at the bottom of the ball (32). This aspiration effect is enhanced by a new tapered entryway (39), creating a Venturi effect at the annular space (103). The angle of the tapered entryway (39) (with respect to the axis) may be approximately between 3 degrees to 20 degrees, depending on the size of valve. The tapering of the area of the tapered entryway (39) extends from the fluid inlet of the entry port and diminishes in area towards the fluid outlet of the tapered entryway (39) towards the bottom of the ball. The tapering may have a reduced diameter to approximately between 75% to 95% of the diameter of the entry port.

The addition of conical holes (30, 31) through the ball (32), the addition of having a curved body surface (38) where the fluid exits the two new conical holes (30, 31), the addition of cutouts (35A, 36A, 35B, 36B) to the top and bottom of the tubular bellows support tubes (34A, 34B), and the addition of a tapered entryway (39) to the valve body (104), act separately and together to keep oil in the ball/body cavity (101) moving up, out, down and around the OD of the ball and the OD of the bellows at all times, thus ensuring fluid exchange in those cavities.

Figure 7:
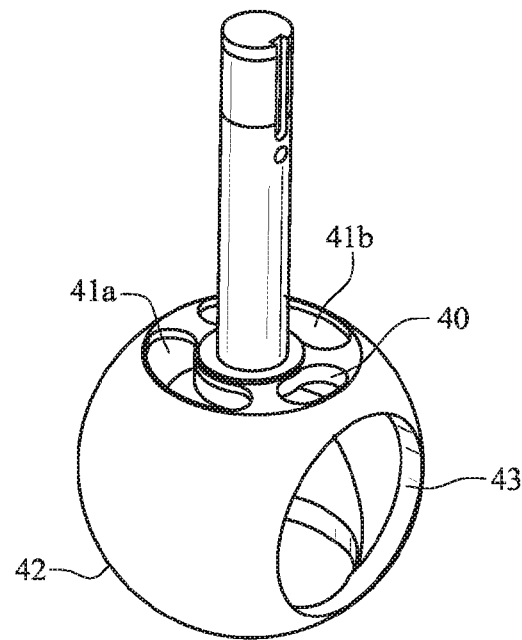
FIG. 7 is an isometric view of a second example embodiment of a novel and improved ball for a switch valve.

FIG. 7 shows a second embodiment of the improved ball, in which a third new conical hole (40) is added to the ball (42). In this embodiment, the three conical holes (41a, 41b, 40) are arranged to provide a maximum opening area, and thus capture a larger amount of oil flowing through the ball (42). Fluid discharges from the three conical holes (41a, 41b, 40) are optimally positioned with respect to the position of the bellows. In FIG. 7, two of the conical holes (41) straddle the axis or centerline of that ball's exit port (43), and a centrally located third hole (40) is added between the first two conical holes (41a, 41b), thus discharging oil into the ball/body cavity (101), as shown in FIG. 6, in three places instead of two.

The addition of the third conical hole (40) is important in the case of a switch valve having three outlets in the body instead of two, with three seats and three bellows that are arranged at 120 degrees from each other. The third conical hole allows positioning of the three conical holes so that the discharge from each conical hole is pointed directly at one of the three bellows in the valve. The three conical holes do not necessarily have like dimensions of length and width, and may be of different size and shape to suit the space available and in accordance with detailed analysis of the flow pattern inside the ball (42) and ball/body cavity. The third conical hole (40) may have an area at the fluid inlet inside the hollow ball (42) approximately between 50% to 90% of the fluid inlet area of the first and second conical holes (41a, 41b).

Alternatively, the conical holes can also be four to six in number, in every case being sized to suit the space available and to maximize recirculation of oil in a switch valve. Regardless of number of holes, the desirable aspiration effect is still present as the oil flows past the annular space (103) in the valve.

Figure 8A:
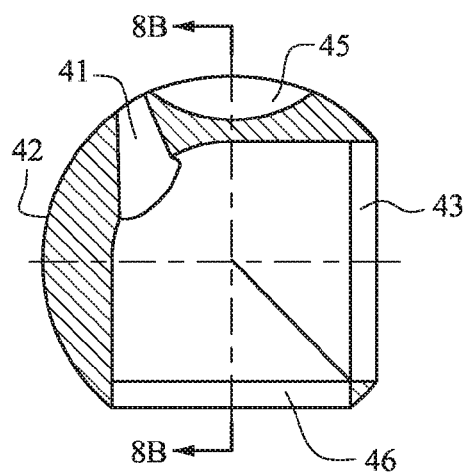
FIG. 8A is a cross-sectional view of the second embodiment ball configuration without the integral drive shaft.
Figure 8B:
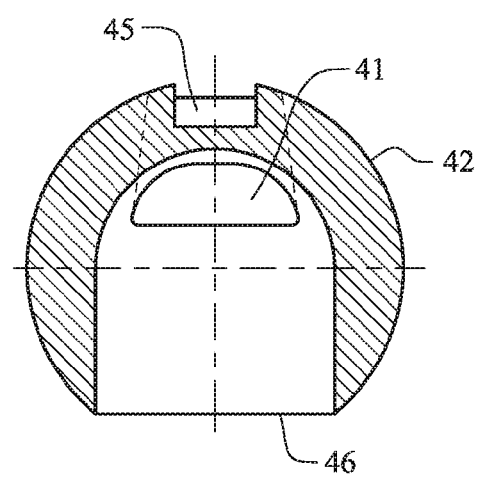
FIG. 8B is a cross-sectional view of the ball configuration shown in FIG. 8A in the direction depicted by line 8B-8B.

FIGS. 8A and 8B show a common alternative ball style for ball valves, with only one large conical hole (41) shown instead of two or three, for the sake of simplification. Additional holes can be added, to make the ball similar to that of FIGS. 4 and 7. This style of ball is called a floating ball, since the drive shaft is not integral with the ball. Instead, the ball has a socket, keyway, slot or the like (45) in the top surface, for engagement with a separate valve shaft, not shown, that includes a tang that fits into the socket/slot (45) to enable turning of the ball. The ball has a ball entry port (46) that feeds the flow into the ball, and a ball exit port (43) that allows flow to exit the ball. The switch valve can alternatively be fitted with this floating ball instead of a ball with integral shaft as in FIG. 7, since the method of turning the ball is not relevant to important features of the example embodiments discussed herein.

Figure 9A:
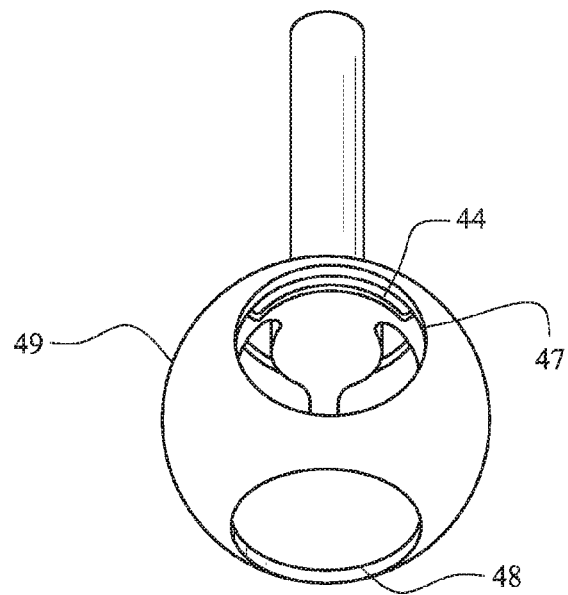
FIG. 9A is an isometric view of a third example embodiment of a novel and improved ball having a partial dam at the exit port of the ball.
Figure 9B:
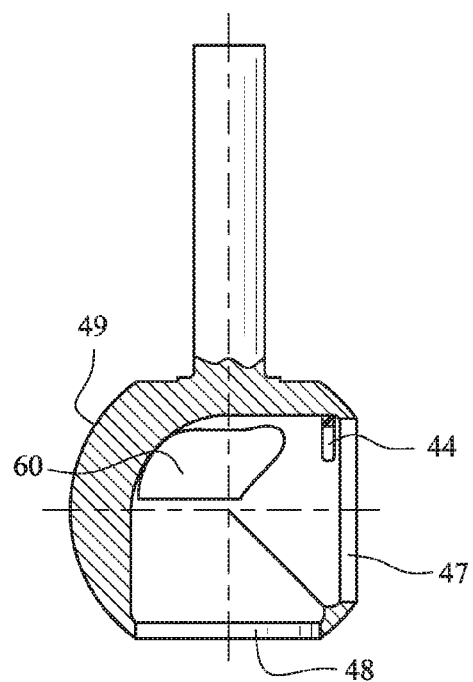
FIG. 9B is a cross-sectional view of the improved ball shown in FIG. 9A.

FIGS. 9A and 9B depict the addition of a partial obstruction (44) in the flow path at the exit port (47) of the ball (49) which increases the pressure inside the ball (49), upstream of the obstruction (44), thereby increasing the tendency of a part of the flow from the entry port (48) through the ball (49) to be forced out through the conical holes (60). The obstruction (44) is shown in the form of a partial dam, which may have a height of approximately between ⅒ to ⅙ of the exit port (47) diameter, and may extend over approximately between 60 degrees to 120 degrees of the exit port (47). The obstruction (44) may alternatively be in the shape of a circular segment, with lower edge being a straight line rather than a curved surface as illustrated, with height of the partial dam approximately between 1/10 to 1/4 of the diameter of the exit port (47).

Thus it can be seen by persons of ordinary skill that the objectives discussed above are achieved by these improved ball and bellows support tube and body designs, those objectives being to eliminate the need for purging of the valve body with steam, while being simple and inexpensive to manufacture, and facilitating the retrofitting of such improvements to existing switch valves.

As should be appreciated, it may not be necessary to concurrently use all the above-described improved features of these example ball valve designs in order to achieve significant improvement over conventional designs. Instead, different combinations of some, but not all, of the improved design features described above may be used to good effect in come applications.

While the example embodiments have been described in connection with what is presently considered to be the most effective and preferred design of new circulation-inducing holes to be added to the ball, new curved body top cover shape, new cutouts of the tubular supports, and new Venturi tapered body inlet, it is to be understood that the invention is not to be limited to the disclosed embodiments, but is to cover other equivalent arrangements of new circulation-inducing holes, body shape, and cutouts of parts, as to their precise number, size, shape, positioning, and orientation, within the scope of the claims.

What is claimed is:

1. A multiport ball valve comprising:
    a valve body with a body cavity having a body entry port along a first axis and at least two body exit ports along respective and different associated axes, said body exit port axes being disposed at predetermined angles from each other and also disposed at a transverse angle with respect to said body entry port axis;
    a hollow ball rotatably disposed within said body cavity and having a ball entry port to an interior space of the ball, with a ball entry port axis that is aligned with the body entry port axis and with a truncated exterior surface opposite said ball entry port, said ball also having a transversely directed ball exit port rotatable to selectively align with each of said body exit ports; and
    a valve seat, disposed in each body exit port, biased inwardly towards a respectively corresponding one of said body exit ports by a compressed bellows housed within a tubular support structure having a plurality of apertures there-within;
    wherein
    said hollow ball includes at least one passage leading from inside said hollow ball to said truncated exterior surface; and
    said body includes a curved interior surface, spaced from and opposing said truncated exterior surface of the ball, said curved interior surface being disposed to direct fluid passing out of said at least one passage of the hollow ball into at least some of said plurality of apertures of the tubular support structure.

2. The multiport ball valve as in claim 1 wherein:
    said hollow ball includes at least two passages, each passage being tapered and arranged along a circular locus, said at least two passages straddling the ball entry port axis along said truncated exterior surface of the ball.

3. The multipart ball valve as in claim 2 wherein each passage is tapered to be larger at an end terminating within said hollow ball than at its other end terminating at said truncated exterior surface of the ball, said at least two tapered passages having a combined area at the ends terminating within said hollow ball that is between 1/2 to 3/4 of said ball entry port area.

4. The multiport ball valve as in claim 2 wherein a cross-section of each of said at least two tapered passages is arcuate in shape.

5. The multipart ball valve as in claim 1 wherein said hollow ball includes at least three passages, and wherein:
    a first two of said passages are tapered and arranged along a circular locus and straddling the ball entry port axis along said truncated exterior surface of the ball; and
    a third of said passages is also tapered, arranged along said circular locus on said truncated surface and located between said first two passages.

6. The multipart ball valve as in claim 5 wherein said third tapered passage has a fluid inlet area of from 50% to 90% that of said first two tapered passage areas.

7. The multiport ball valve as in claim 1 wherein said body entry port is tapered from a larger cross section at a fluid inlet of the body entry port to a smaller cross section at a fluid outlet of the body entry port along a flow path into said body entry port.

8. The multipart ball valve as in claim 7 wherein a diameter of said fluid outlet of the body entry port is reduced to between 75% to 95% of a diameter of said fluid inlet of the body entry port.

9. The multiport ball valve as in claim 1 wherein said plurality of apertures on said tubular support structure are disposed with openings of said, plurality of apertures aligned with fluid flow paths from said at least one passage in the ball as deflected by said curved interior surface.

10. The multiport ball valve as in claim 1 wherein said curved interior surface has an inside diameter that coincides with an inside edge of said at least one passage in said ball and the curved interior surface has an outside diameter extending to a maximum length of said tubular support structure, such that said curved interior surface is donut-shaped when viewed in a plane parallel to said truncated exterior surface of said ball.

11. The multiport ball valve as in claim 1 further comprising:
    an obstruction formed within the ball exit port to act as a dam partially obstructing fluid flow from the ball exit port.

12. The multiport ball valve as in claim 11 wherein said obstruction is arcuate shaped, and has a height of between 1/10 to 1/6 of a diameter of said ball exit port, has a length extending between a 60 to 120 degree portion of said ball exit port, and has a width extending from said ball exit port into said hollow ball of between 1/50 to 1/10 of said diameter of said ball exit port.

13. A multiport ball switch valve comprising:
    a valve body with a body cavity having a body entry port along a body entry port axis and at least two body exit ports along respective and different associated body exit port axes, said body exit port axes being disposed at predetermined angles from each other and also disposed at a transverse angle with respect to said body entry port axis;
    a hollow ball rotatably disposed within said body cavity and having a ball entry port to an interior space of the ball, with a ball entry port axis that is aligned with the body entry port axis, said ball also having (a) a transversely directed ball exit port rotatable to selectively align with each of said body exit ports and (b) a truncated exterior surface opposite said ball entry port; and a metal bellows coaxially disposed along each of said body exit port axes, said metal bellows being in compression within an apertured tubular support, a first end of said metal bellows being in contact with a metal valve seat, and a second end of said metal bellows being in contact with said apertured tubular support;

wherein said hollow ball includes at least one passage leading from inside said hollow ball to said truncated exterior surface and to at least one aperture in said tubular support.

14. The multipart ball switch valve as in claim 13 wherein there are plural of said passages through the ball, each said passage being tapered and respectively aligned with a corresponding at least one aperture of a corresponding one of said tubular supports.

15. A multipart ball valve comprising:

a valve body with a body cavity and a hollow ball selectively rotatable within said body cavity to switch fluid from a tapered valve body entry port to one of a plurality of valve exit ports, said hollow ball having at least one hole there-through with one end being disposed opposite said entry port and another end disposed in said body cavity;

said valve body having an internally curved concave surface disposed opposite said at least one hole of the hollow ball; and a valve seat at each of said valve exit ports, each said valve seat being in contact with a respectively corresponding compressed bellows within an apertured tubular support that has an external apertured surface in fluid communication with a space at least partially defined or delimited by said internally curved concave surface of the valve body.

16. The multipart ball valve as in claim 15 wherein:

said hollow ball includes two through-holes, each through-hole being tapered, said two through-holes being disposed to straddle the entry port.

17. The multipart ball valve as in claim 16 wherein each of said through-holes is tapered to be larger at an end terminating within said hollow ball than at its other end terminating at said body cavity.

18. The multipart ball valve as in claim 16 wherein a cross-section of each of said through-holes is arcuate in shape.

19. The multipart ball valve as in claim 15 wherein said hollow ball includes at least three through-holes, and wherein:

a first two of said through-holes are tapered and arranged along a circular locus and straddling the entry port; and a third of said through-holes is also tapered, arranged along said circular locus and located between said first two through-holes.

* * * * *